US008542380B2

(12) United States Patent
Shimura

(10) Patent No.: US 8,542,380 B2
(45) Date of Patent: Sep. 24, 2013

(54) IMAGE PROCESSING APPARATUS AND METHOD FOR ERASING AN IMAGE BASED ON A MARK READ FROM A SHEET

(75) Inventor: Norio Shimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1064 days.

(21) Appl. No.: 11/461,183

(22) Filed: Jul. 31, 2006

(65) Prior Publication Data

US 2007/0035791 A1    Feb. 15, 2007

(30) Foreign Application Priority Data

Aug. 10, 2005    (JP) .................. 2005-231937

(51) Int. Cl.
*G06F 3/12*    (2006.01)
(52) U.S. Cl.
USPC ....... 358/1.15; 358/1.14; 358/1.16; 358/1.18; 348/207.2
(58) Field of Classification Search
USPC ............... 358/1.12, 1.18, 1.15, 1.16; 705/1; 348/207.1, 207.2
See application file for complete search history.

(56) References Cited

U.S. PATENT DOCUMENTS

| 2001/0052993 | A1* | 12/2001 | Lumley | 358/1.12 |
| 2002/0085228 | A1* | 7/2002 | Yagita | 358/1.15 |
| 2003/0184801 | A1* | 10/2003 | Murata | 358/1.16 |
| 2004/0012812 | A1* | 1/2004 | Shimizu | 358/1.15 |
| 2004/0047001 | A1* | 3/2004 | Gehring et al. | 358/1.18 |
| 2004/0145770 | A1* | 7/2004 | Nakano et al. | 358/1.18 |
| 2004/0212832 | A1* | 10/2004 | Shibata | 358/1.15 |
| 2005/0174431 | A1* | 8/2005 | Ohmura et al. | 348/207.1 |
| 2005/0278190 | A1* | 12/2005 | Nakai et al. | 705/1 |

* cited by examiner

*Primary Examiner* — Twyler Haskins
*Assistant Examiner* — Nicholas Pachol
(74) *Attorney, Agent, or Firm* — Fitzpatrick, Cella, Harper & Scinto

(57) ABSTRACT

A multifunction printer which can erase image data, which is specified by using a sheet on which a list of image data in a memory card printed, from the memory card. It is also a multifunction printer which can erase specified image data from a memory card after the specified image data is printed or stored in another storage medium.

6 Claims, 8 Drawing Sheets

IMAGE PROCESSING APPARATUS AND METHOD FOR ERASING AN IMAGE BASED ON A MARK READ FROM A SHEET

BACKGROUND OF THE INVENTION

1. Field of the Invention

The present invention relates to a multifunction printer for reading out and printing any digital image from a memory card on which digital images are stored.

2. Description of the Related Art

A printer of nowadays has a memory card slot for inserting a memory card to be used in a digital camera or the like, and an operation panel for a user to input designation or the like of a print setting. In such a case, the printer has a function of printing a digital image in a memory card by the printer alone without connecting to the PC (so-called direct printing function).

A multifunction printer with a scanner function (image reading apparatus), enabling operation such as scanning, copying and the like other than printing has been penetrating into the market.

In such a multifunction printer with a direct printing function, as an approach to easily print image data such as that from a digital camera or the like without using a PC, one shown below is known. For example, functions of arranging a plurality of images in a memory card, marking on a printed image selecting sheet and selecting an image to be printed, reading in the marked image selecting sheet and printing the selected image are known.

As a multifunction printer with such a direct printing function, one with a function of erasing image data in a memory card without using a PC is known.

If a user erases image data in a memory card by a multifunction printer with a direct printing function without using a PC and the printer has a viewer (image displaying function), the user makes the viewer display the image data piece by piece and selects a piece of image data the user wants to erase.

If a multifunction printer does not have a viewer, a user needs to perform index printing, select a piece of image data the user wants to erase as viewing the index print and designate the piece of image data to erase on an operation panel by the ID number, the file name or the like. The "index printing" is to print a plurality of pieces of image data on a sheet of paper.

All the cases mentioned above have a problem in that it is very difficult for a user to search for an image the user wants to delete and designate to erase the image, and that the user could delete an unwanted image data, particularly when the user uses a memory card which stores a plurality of pieces of image data.

SUMMARY OF THE INVENTION

The present invention intends to provide a multifunction printer which can easily and certainly erase specified image data in a plurality of pieces of image data in a memory card.

The present invention also intends to provide a multifunction printer which can erase a specified image data after the specified image data is normally printed, when the specified image data among a plurality of pieces of image data in a memory card is to be erased.

The present invention has an advantage of easily erasing image data a user wants to erase in a memory card, as the user prints an image selecting sheet, puts a tick on an image the user wants to erase, and makes the image selecting sheet read in.

Further features of the present invention will become apparent from the following description of exemplary embodiments (with reference to the attached drawings).

DESCRIPTION OF THE EMBODIMENTS

The preferred embodiments for implementing the present invention will be embodiments below.

First Embodiment

Figure 1:
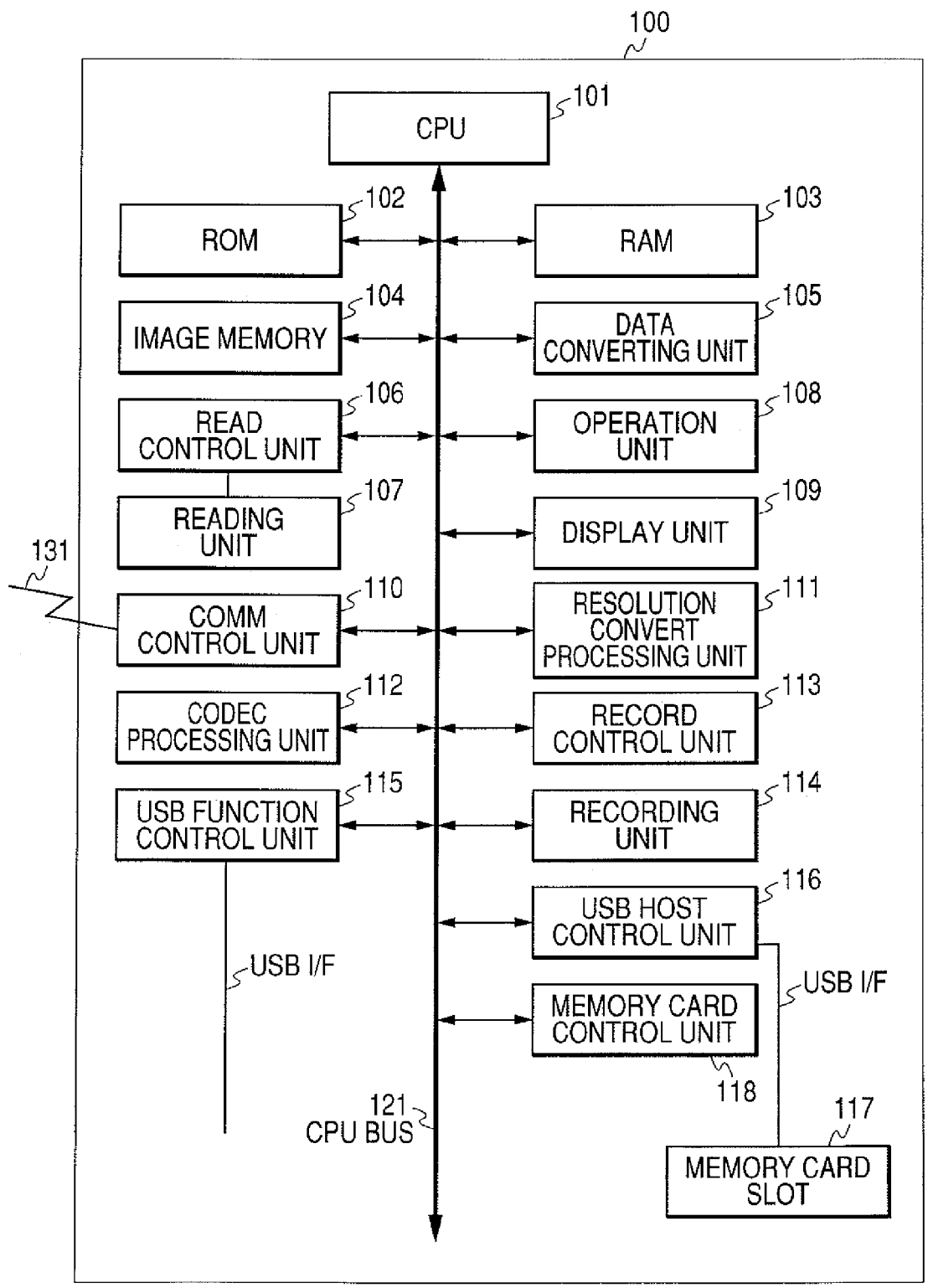
FIG. 1 is a block diagram showing an outlined configuration of a multifunction printer (MFP) apparatus 100 which is a first embodiment of the present invention.

FIG. 1 is a block diagram showing an outlined configuration of a multifunction printer (MFP) apparatus 100, which is a first embodiment of the present invention.

The MFP apparatus 100 has a CPU 101, a ROM 102, a RAM 103, an image memory 104, a data converting unit 105, a read control unit 106, a reading unit 107, an operation unit 108, a display unit 109 and a communication control unit 110. The MFP apparatus 100 has a resolution convert processing unit 111, a codec processing unit 112, a record control unit 113, a recording unit 114, a USB function control unit 115 and a USB host control unit 116. The MFP apparatus 100 also has a memory card slot 117, a memory card control unit 118 and a CPU bus 121.

The CPU 101 is a system control unit and controls over the entire MFP apparatus 100.

The ROM 102 stores a controlling program executed by the CPU 101, an embedded operating system (OS) program and the like.

The RAM 103 consists of SRAM (static RAM) and the like and stores program controlling variables and the like, and also stores set values registered by an operator or management data and the like of the MFP apparatus 100 and includes buffer regions for various works.

The image memory 104 consists of DRAM (dynamic RAM) and the like and accumulates image data.

The data converting unit 105 executes image data conversion such as analysis of a page description language (PDL) and the like and developing or the like of CG (computer graphics) of character data.

The read control unit 106 controls the reading unit 107. The reading unit 107 consists of a CCD, a CIS or the like, and performs various types of image processing such as binarizing processing and halftone processing on image signals of an original, which is optically read and converted into electric image data, via an image processing control unit (not shown), and outputs high definition image data.

The operation unit 108 has a numeral input key, a character input key, a one-touch telephone number key, a mode setting key, a decision key, a cancel key and the like, and an operator performs decision operation of destination data of image transmission or registration operation of set data.

The display unit 109 consists of an LED (light emitting diode), an LCD (liquid crystal display) and the like. The display unit 109 displays various types of inputting operation performed by an operator via the operation unit 108, and also displays an operating state and a status of the MFP apparatus 100 and image data accumulated in the image memory 104.

The communication control unit 110 consists of a MODEM (modulator-demodulator), an NCU (net control nit) and the like. The communication control unit 110 is connected to an analog communication line (PSTN) 131, and performs line control such as communication control by the T30 protocol and sending/receiving a call to/from a communication line.

The resolution convert processing unit 111 performs resolution convert control such as mili-inch resolution conversion of image data and the like. The resolution convert processing unit 111 can also perform enlargement/reduction processing of image data.

The coder processing unit 112 performs coder/decoder processing or enlargement/reduction processing of image data (MH, MR, MMR, JBIG, JPEG or the like) treated by the MFP apparatus 100.

The record control unit 113 performs various types of image processing such as smoothing processing, record density correction processing, color correction or the like via an image processing control unit (not shown) on image data to be printed, converts it into image data for printing, and accumulates it into the image memory 104. The record control unit 113 regularly obtains status information data of recording unit 114.

The recording unit 114 is a printing apparatus consisting of a laser beam printer, an ink jet printer and the like. The recording unit 114 retrieves image data for printing converted at the record control unit 113 and accumulated in the image memory 104, and prints color image data or monochrome image data on printing materials.

The USB function control unit 115 performs communication control of a USB interface. The USB function control unit 115 performs protocol control according to the USB communication standard, and converts data from a USB control task executed by the CPU 101 into a packet, and performs a USB packet transmission to an external information processing terminal. The USB function control unit 115 converts the USB packet from the external information processing terminal into data and sends it to the CPU 101.

The USB host control unit 116 is a control unit for performing communication in a protocol defined by the USB communication standard. The USB communication standard is a standard which can perform high-speed bi-directional data communication and it can connect a plurality of hubs or functions (slaves) to a single host (master). The USB host control unit 116 has a function of a host in USB communication.

The memory card slot 117 is connected to the USB host control unit 116 via the USB interface and loaded with a detachable memory card.

The memory card control unit 118 can access to an image data file stored in a memory card loaded on the memory card slot 117 so as to read/write it.

Next, a function of erasing image data in a memory card in the multifunction printer 100 with the abovementioned configuration will be described.

Figure 3:
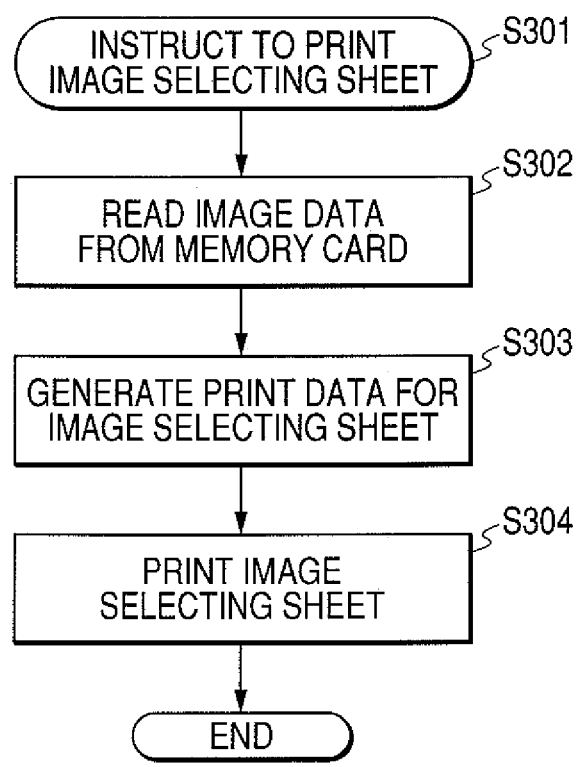
FIG. 3 is a flowchart showing processing of erasing image data in a memory card in the MFP apparatus 100.
Figure 4:
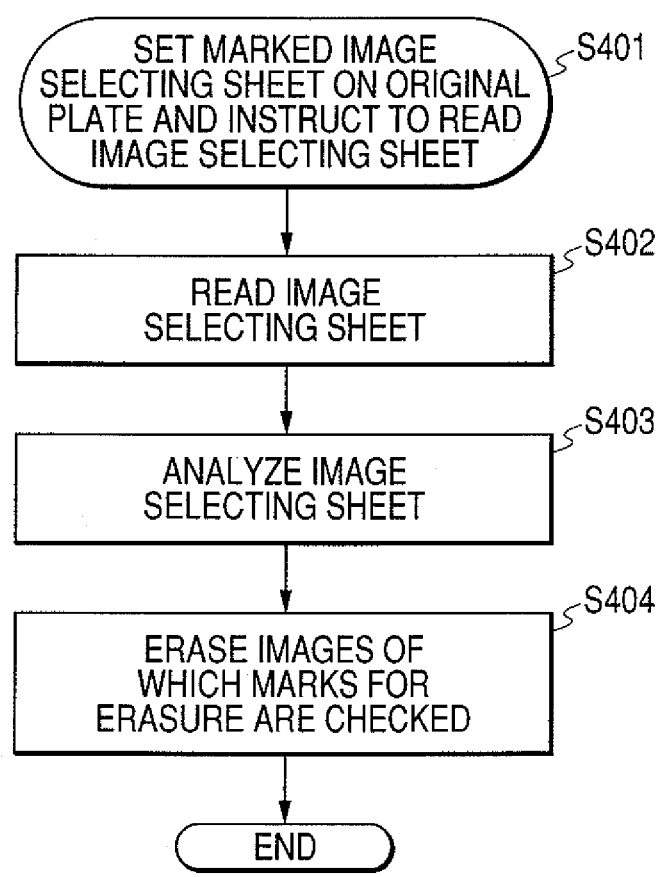
FIG. 4 is a flowchart showing processing of erasing image data in the memory card in the MFP apparatus 100.

FIG. 3 and FIG. 4 are flowcharts showing processing for erasing image data in a memory card in the MFP apparatus 100.

First, a user performs a print instruction on an image selecting sheet SH1 (S301) by operating various keys on the operation unit 108 to select and execute an image selecting sheet printing function.

The memory card control unit 118 reads stored image data from the memory card loaded on the memory card slot 117 (S302). The record control unit 113 generates print data of a layout for the image selecting sheet SH1 for the read image data (S303) and the recording unit 114 prints generated print data (S304).

The image selecting sheet SH1 is a sheet on which a list of image data in the memory card and check marks for performing erase selection (specification) are printed.

Figure 2:
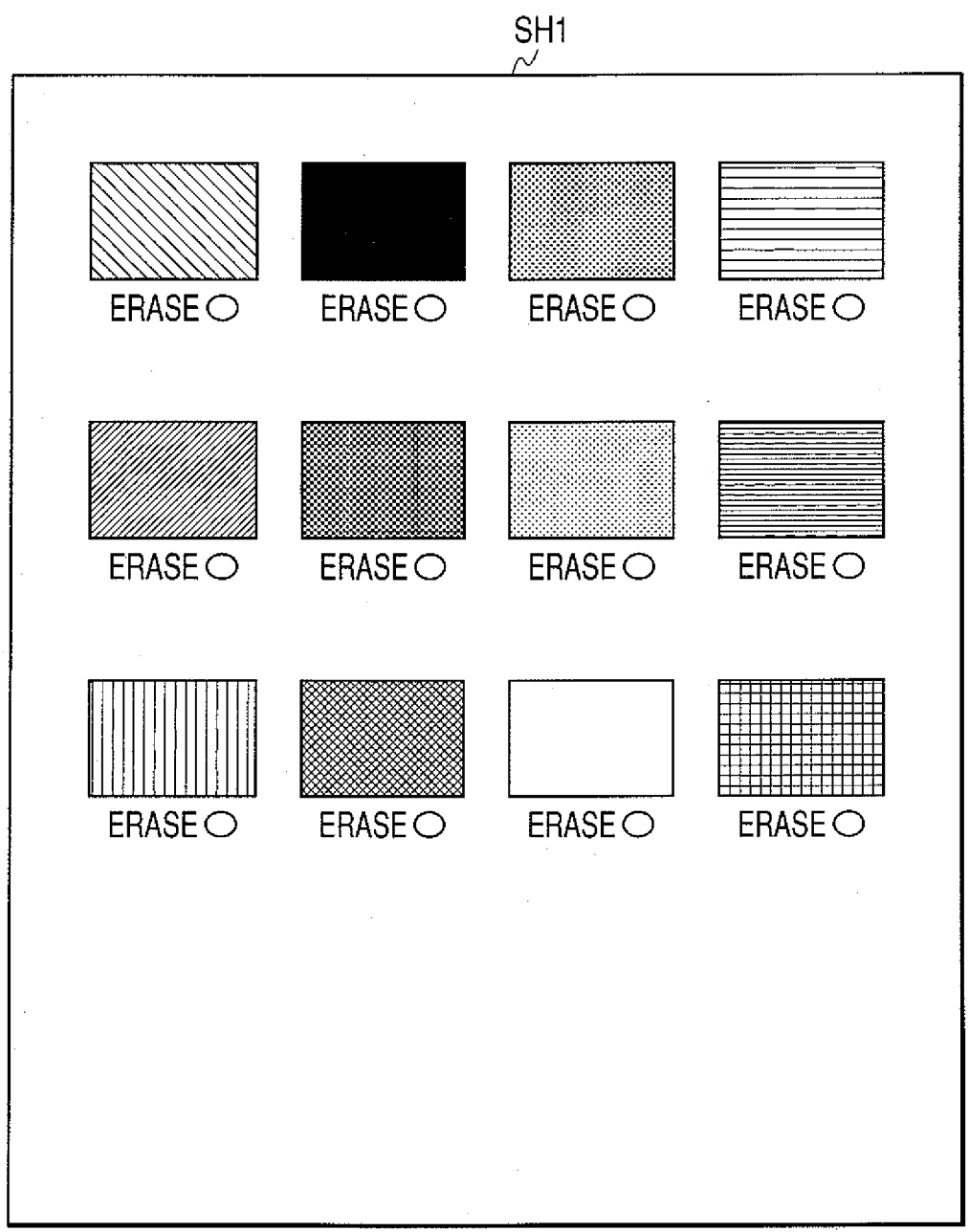
FIG. 2 is a diagram showing an image selecting sheet SH1 used in the first embodiment.

FIG. 2 is a diagram showing the image selecting sheet SH1 used in the first embodiment.

The image selecting sheet SH1 is a sheet on which a print selecting (specifying) check mark is printed with each image.

As shown in FIG. 2, an erase selecting (specifying) check mark is applied to each piece of image data.

The user specifies image data to erase among the image data by selecting a piece of image data the user wants to erase and filling the erasing check mark of the corresponding image selecting sheet SH1. The user sets the image selecting sheet SH1 with check marks filled on the reading unit 107, operates various keys on the operation unit 108 to select and execute an image selecting sheet reading function and thereby reads the image selecting sheet SH1 (S401).

The reading unit 107 optically reads the image selecting sheet SH1 and generates read data (S402). The read control unit 106 analyzes read data of the image selecting sheet SH1 which is read by the reading unit 107 and determines whether the erasing check mark is checked or not (S403). The memory card control unit 118 erases the image data corresponding to the checked check mark from the memory card (S404).

Accordingly, the user can easily erase image data in the memory card the user wants to erase without erasing an unintended image.

Second Embodiment

The second embodiment of the present invention is another embodiment of a function of erasing image data in a memory card.

Figure 6:
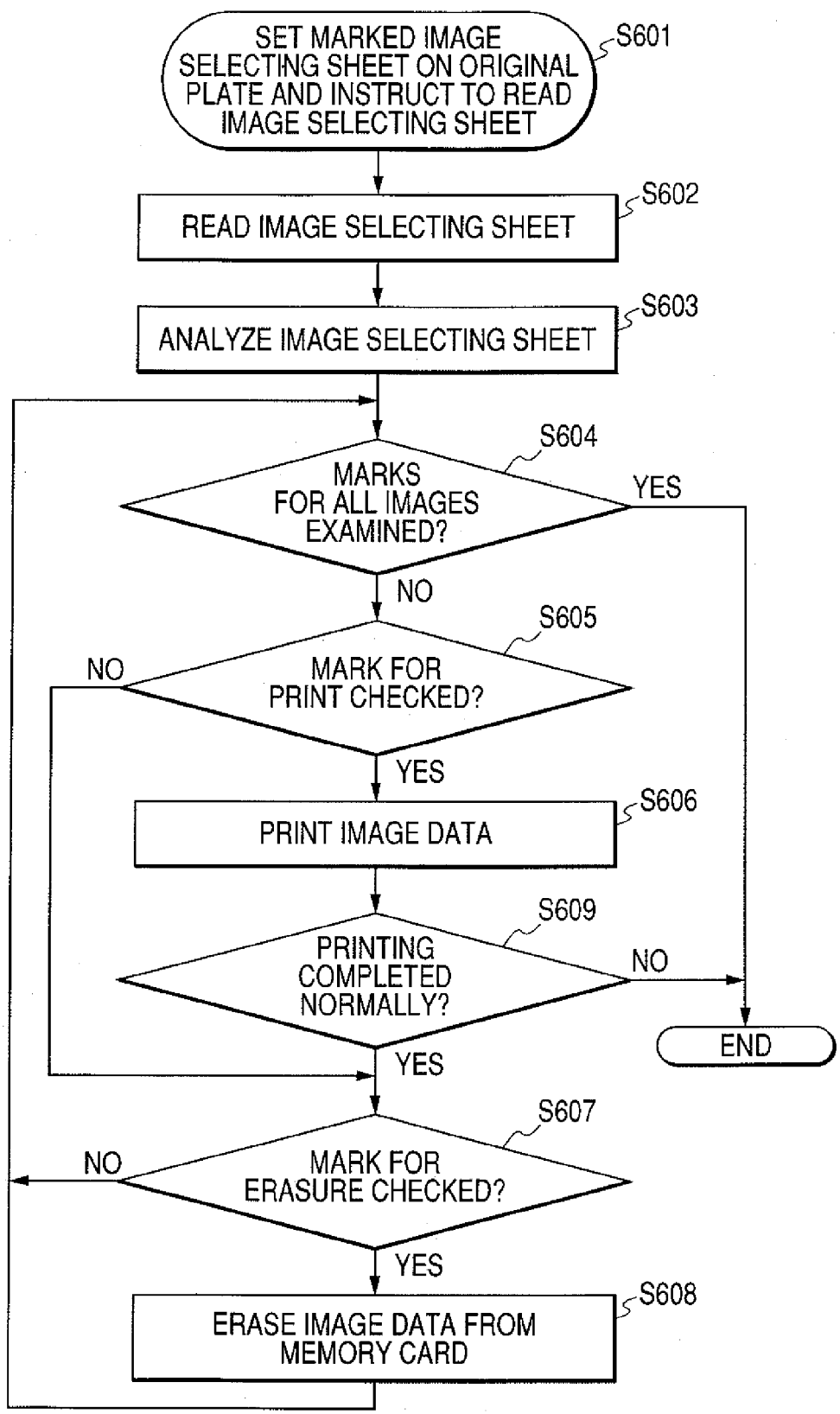
FIG. 6 is a flowchart showing processing of a function of erasing image data in a memory card in the second embodiment.

FIG. 3 and FIG. 6 are flowcharts showing processing of a function of erasing image data in a memory card in the second embodiment.

First, a user operates various keys on the operation unit 108 to select and execute a function of printing an image selecting sheet SH2, and thereby performs a print instruction of the image selecting sheet SH2 (S301). That is to say, it specifies image data to be printed among a plurality of pieces of image data.

The memory card control unit 118 reads image data stored in the memory card loaded on the memory card slot 117 (S302). The record control unit 113 generates print data of a layout for the image selecting sheet SH2 for the read image data (S303), and the recording unit 114 prints the generated print data (S304).

The image selecting sheet SH2 is a sheet on which a list of image data in the memory card, check marks for specifying image data the user wants to print and check marks for specifying image data to be erased.

Figure 5:
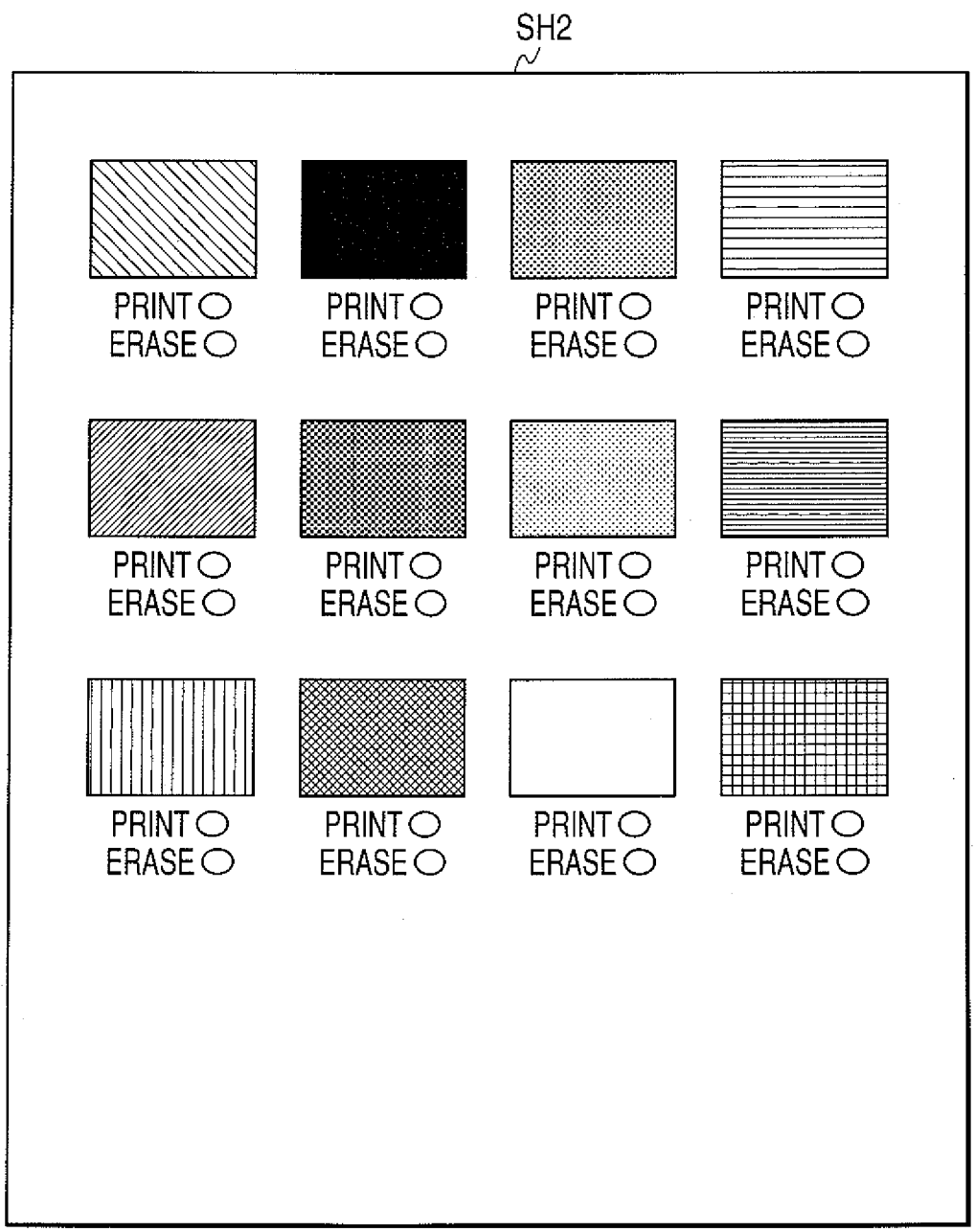
FIG. 5 is a diagram showing an image selecting sheet SH2 used in a second embodiment.

FIG. 5 is a diagram showing the image selecting sheet SH2 used in the second embodiment.

The image selecting sheet SH2 is a sheet on which check marks for specifying printing and check marks for specifying erasing are printed with each image.

The user selects an image the user wants to print and an image the user wants to erase, and fills a check mark for printing and a check mark for erasing a corresponding image selecting sheet SH2. That is to say, the user specifies an image data by filling its check mark.

For image data the user only wants to print, the user fills the check mark for printing. For image data the user only wants to erase, the user fills the check mark for erasing. For image data the user wants to erase after it is printed, the user fills both the check mark for printing and the check mark for erasing.

The user sets the image selecting sheet SH2 with the check marks filled on the reading unit 107, operates various keys on the operation unit 108 to select and execute an image selecting sheet reading function and thereby performs an instruction to read the image selecting sheet SH2 (S601).

The reading unit 107 optically reads the image selecting sheet SH2 and generates read data (S602). The read control unit 106 analyses read data of the image selecting sheet SH2 which is read by the reading unit 107 and determines whether the check mark for printing and the check mark for erasing are checked or not (S603).

It determines whether the check mark for printing is checked or not for each image (S605). If the check mark for printing is checked, the record control unit 113 generates image data for printing from the image data, and the recording unit 114 prints generated image data (S606).

If the check mark for erasing is checked (S607), the memory card control unit 118 erases the image data from the memory card (S608).

The operation is repeated for the entire image data printed on the image selecting sheet SH2 (S604).

It further checks whether the printing is normally performed or not (S609). If the printing does not normally finish, it may finish the processing without erasing image data after that. The case where the printing is not performed normally is such a case of an out of paper error, an out of ink error, or other printer abnormality error.

If the printing is not normally performed and the processing ends without erasing the image data, the LCD (liquid crystal display) or the like of the display unit 109 may display a message indicating that. Alternatively, if an error is released, a message indicating that may be printed out.

If the printing is not normally performed and the processing ends without erasing the image data, previous reading processing of the image selecting sheet SH2 is executed again and following printing may be performed from the printing processing of an image where an error occurred.

If the printing is not normally performed and the processing ends without erasing image data, the image selecting sheet SH2 may be created again anew.

In such a manner, the user can easily erase an image data which becomes unnecessary after it is printed without erasing an unintended image. If the printing does not normally end, the data is never erased from the memory card, thus, it never erased without being printed.

Third Embodiment

The third embodiment of the present invention is another embodiment of a function of erasing image data in a memory card.

Figure 8:
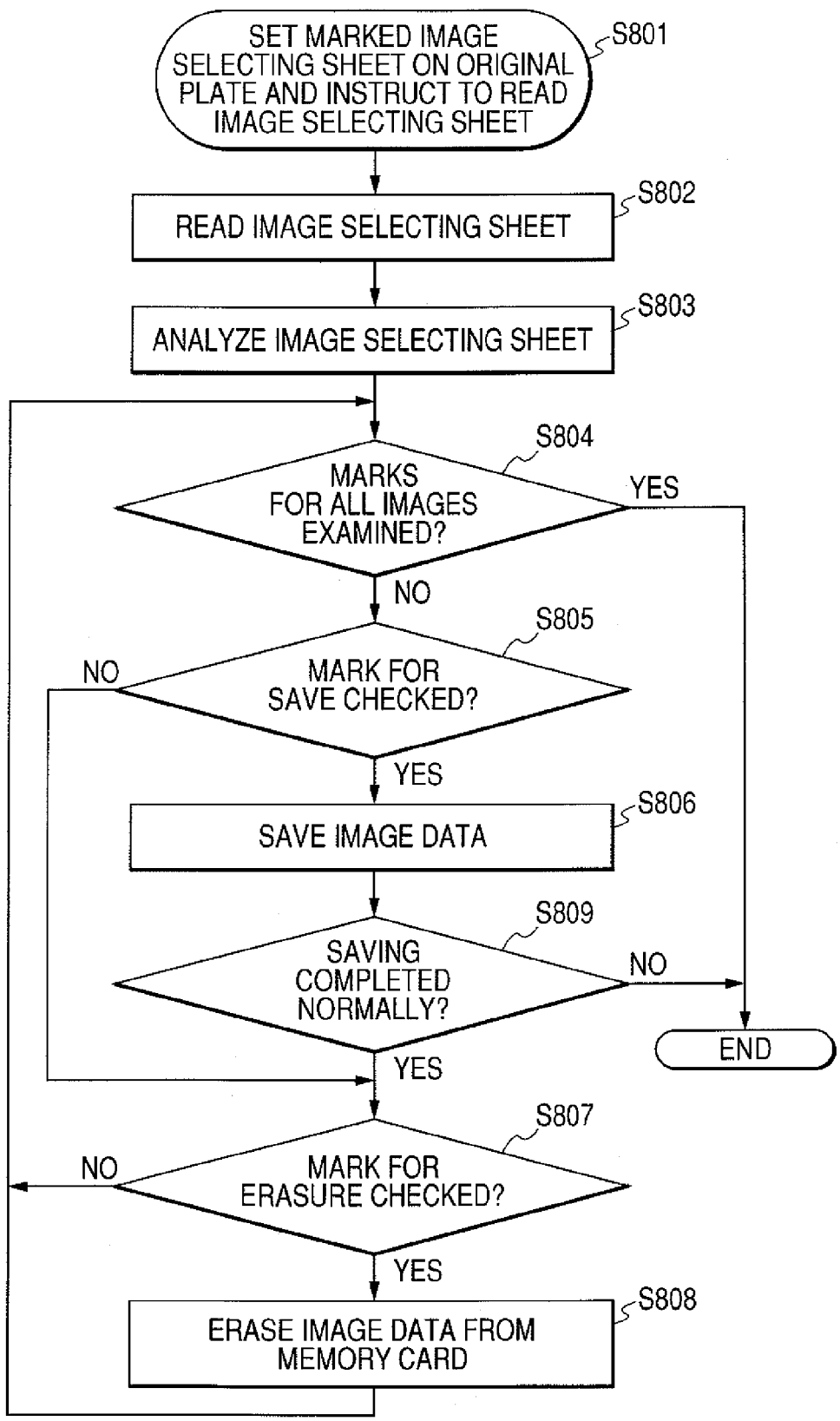
FIG. 8 is a flowchart showing processing operation of a function of erasing image data in a memory card in the third embodiment.

FIG. 3 and FIG. 8 are flowcharts showing processing operation of the function of erasing image data in a memory card in the third embodiment.

A user operates various keys on the operation unit 108 to select and execute a function of printing an image selecting sheet and thereby performs an instruction to print an image selecting sheet SH3 (S301).

The memory card control unit 118 reads stored image data from a memory card which is loaded on the memory card slot 117 (S302). The record control unit 113 generates print data for a layout of the image selecting sheet SH3 based on read image data (S303), and the recording unit 114 prints generated print data (S304).

Figure 7:
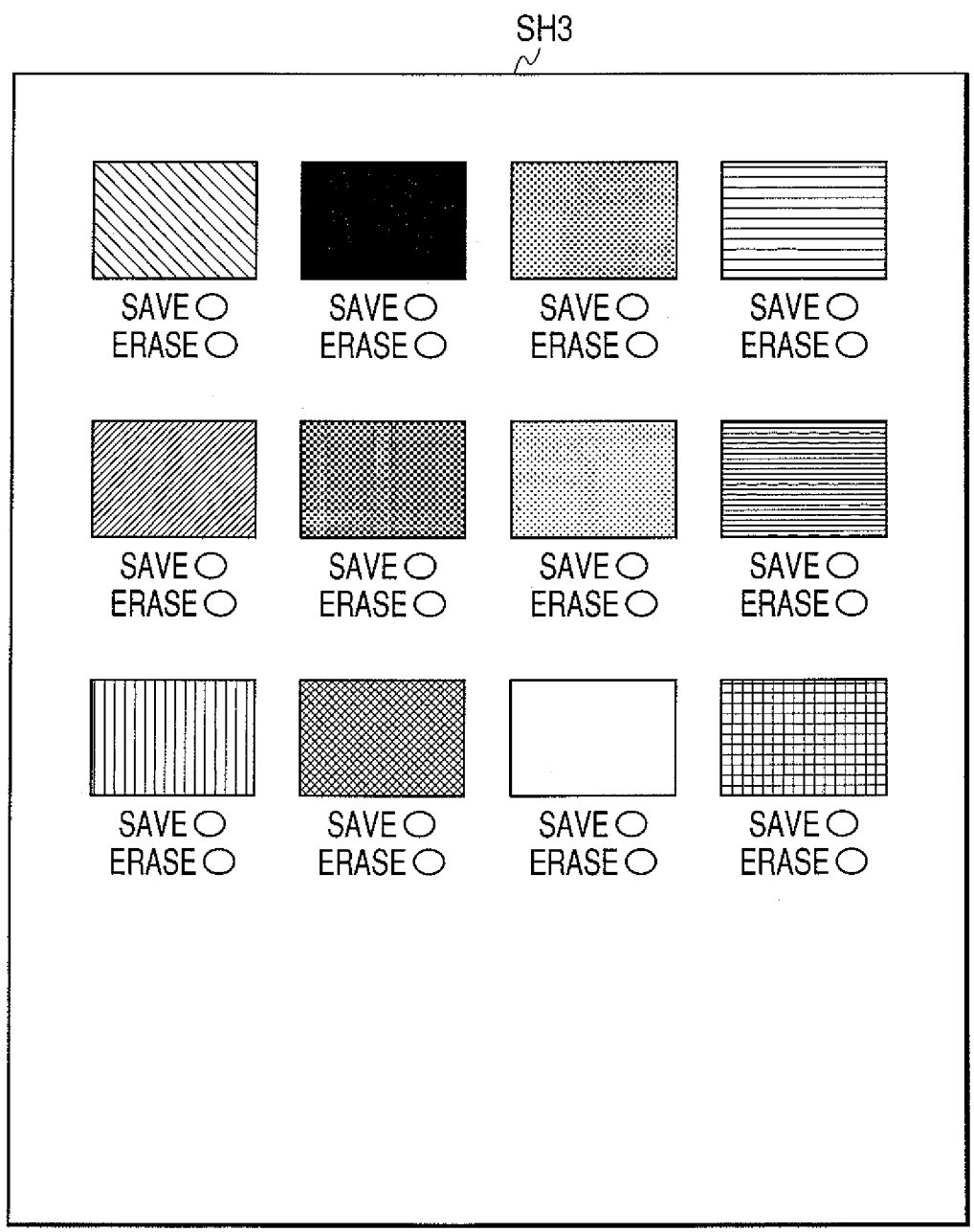
FIG. 7 is a diagram showing an image selecting sheet SH3 used in a third embodiment.

FIG. 7 is a diagram showing the image selecting sheet SH3 used in the third embodiment.

The image selecting sheet SH3 is a sheet on which a list of image data in the memory card, check marks for a user to select storing, and check marks for a user to select erasing are printed. That is to say, the image selecting sheet SH3 has check marks for selecting storing and check marks for selecting erasing for each image data.

The user selects an image the user wants to store and an image the user wants to erase, and fills a corresponding check mark for storing and a corresponding check mark for erasing of the image selecting sheet SH3. Accordingly, the user specifies the image data the user wants to store or the image data the user wants to erase.

For image data the user only wants to store, the user fills the check mark for storing. For image data the user only wants to erase, the user fills the check mark for erasing. For image data the user wants to erase after it is stored, the user only needs to fill both the check mark for storing and the check mark for erasing corresponding to the image data.

The user sets the image selecting sheet SH3 with the check marks filled on the reading unit 107, operates various keys on the operation unit 108 to select and execute an image selecting sheet reading function and thereby performs an instruction to read the image selecting sheet SH3 (S801).

The reading unit 107 optically reads the image selecting sheet SH3 and generates read data (S802). The read control unit 106 analyzes the read data of the image selecting sheet SH3 which is read by the reading unit 107 and determines whether the check mark for storing and the check mark for erasing are checked (filled) or not (S803).

It determines whether the check mark for storing is checked or not, and if the check mark for storing is checked (S805), the memory card control unit 118 reads the image data from the memory card and stores it in the storage device (not shown) (S806).

Next, it determines whether the check mark for erasing is checked or not, and if the check mark for erasing is checked (S807), the memory card control unit 118 erases the image data from the memory card (S808).

The above operation is repeated for the entire image data printed on the image selecting sheet SH3 (S804).

Here, the storage device (not shown) is a hard disk, a writable CD-R, DVD-R drive or the like.

It further checks whether storage is normally performed or not (S809), and if the storage does not finish normally, it may finish the processing without erasing image data after that.

The case where the storage is not normally performed is a case where a destined storage device has no free space or a case where an error occurs in the storage device.

Accordingly, the user can easily erase an image data which becomes unnecessary after it is stored without erasing an unintended image. If the storage does not normally finish, the image data is never erased from the memory card, thus, it never erased without being stored.

According to the abovementioned embodiment, image data in the memory card which the user wants to erase can be easily erased without erasing an unintended image, as the user prints the image selecting sheet, checks an image the user wants to erase and reads it into the image selecting sheet.

According to the abovementioned embodiment, if the printing is not normally ends, it is never erased from the memory card, as the check marks for printing are provided on the image selecting sheet and image data is erased after it is printed.

According to the abovementioned embodiment, if the storage is not normally ends, it is never erased from the memory card, as the check marks for storing are provided on the image selecting sheet and image data is erased after it is stored.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

In the first to third embodiments, the description has been made with considering images stored in the memory card as target images to be erased. But, images stored in the storage device (not shown) which has been referred to in the third embodiment, may be considered as target images to be erased. Further, in this case, a memory card may be used as a destined storage device of the target images to be erased, as described in the third embodiment.

This application claims priority from Japanese Patent Application No. 2005-231937 filed Aug. 10, 2005, which is hereby incorporated by reference herein.

What is claimed is:

1. An image processing apparatus comprising:
a print control unit configured to cause a printing apparatus to print a sheet image, on a sheet, corresponding to a plurality of images stored in a memory and including a plurality of mark areas including a plurality of first mark areas for instructing, for each of the plurality of images, whether to execute a printing process through the printing apparatus on the image, and a plurality of second mark areas for instructing, for each of the plurality of images, whether to erase the image from the memory;
an acquiring unit configured to acquire an image read by a reading apparatus of the sheet on which the sheet image is printed by the printing apparatus, with at least one of the plurality of mark areas being marked by a user;
a processing unit configured to execute
the printing process through the printing apparatus on an image corresponding to one of the first mark areas being marked, and/or
the process of erasure on an image corresponding to one of the second mark areas being marked from the memory,
sequentially for each of images corresponding to at least one of the first mark areas and the second mark areas being marked in the read image acquired by said acquiring unit; and
a determining unit configured to determine whether said processing unit executes and successfully completes the printing process through the printing apparatus on each image, for printing of each image,
wherein, in a case where said both the printing process through the printing apparatus and the process of erasure are to be executed on a set of images, for each of the set of images,
when said determining unit determines that said processing unit executes and successfully completes the printing process through the printing apparatus on the image, said processing unit executes the process of erasure on the image, and
when said determining unit determines that said processing unit executes but does not successful complete the printing process through the printing apparatus on the image, the process of erasure for the image, and the printing process and the process of erasure for all subsequent images among the set of images are inhibited.

2. The image processing apparatus according to claim 1, further comprising:
a deciding unit configured to decide that at least one of the printing process and the process of erasure is to be executed on each of the plurality of images, for each image and in order,
wherein said processing unit executes, for each decision made for an image by said deciding unit, at least one of the printing process on that image and the process of erasing that image from the memory.

3. The image processing apparatus according to claim 1, wherein said processing unit erases an image when said determining unit determines that successful completion of the printing process on the image has occurred.

4. An image processing method comprising steps of:
causing a printing apparatus to print a sheet image, on a sheet, corresponding to plurality of images stored in a memory and including a plurality of mark areas including a plurality of first mark areas for instructing, for each of the plurality of images, whether to execute a printing process through the printing apparatus on the image, and a plurality of second mark areas for instructing, for each of the plurality of images, whether to erase the image from the memory;
acquiring an image read by a reading apparatus of the sheet on which the sheet image is printed by the printing apparatus, with at least one of the plurality of mark areas being marked by a user;
executing
the printing process through the printing apparatus on an image corresponding to one of the first mark areas being marked, and/or
the process of erasure on an image corresponding to one of the second mark area being marked from the memory,
sequentially for each of images corresponding to at least one of the first mark areas and the second mark areas being marked in the read image acquired in said acquiring step; and
determining whether the printing process through the printing apparatus is executed and completed successfully on each image, for printing of each image,
wherein, in a case where both the printing process through the printing apparatus and the process of erasure are to be executed on a set of images, for each of the set of images,
when it is determined in said determining step that the printing process through the printing apparatus is executed and completed successfully on the image, the process of erasure is executed on the image in said executing step, and
when it is determined in said determining step that the predetermined process is executed but not completed successfully on the image, the process of erasure for the image, and the printing process and the process of erasure for all subsequent images among the set of images are inhibited.

5. The image processing method according to claim 4, further comprising a deciding step of deciding that at least one of the printing process and the process of erasure is to be executed on each of the plurality of images, for each image and in order, wherein in said executing step, at least one of the printing process and the process of erasure is executed on an image for each decision made in said deciding step.

6. A non-transitory, computer-readable storage medium storing, in executable form, a program causing a computer to execute an image processing method comprising steps of:

causing a printing apparatus to print a sheet image, on a sheet, corresponding to a plurality of images stored in a memory and including a plurality of mark areas including a plurality of first mark areas for instructing, for each of the plurality of images, whether to execute a printing process through the printing apparatus on the image, and a plurality of second mark areas for instructing, for each of the plurality of images, whether to erase the image from the memory;

acquiring an image read by a reading apparatus of the sheet on which the sheet image has been printed by the printing apparatus, with at least one of the plurality of mark areas being marked by a user;

executing the printing process on an image corresponding to one of the first mark areas being marked, and/or the process of erasure on an image corresponding to one of the second mark areas being marked from the memory, sequentially for each of images corresponding to at least one of the first mark areas and the second mark areas being marked in the read image acquired in said acquiring step; and determining whether the printing process through the printing apparatus is executed and completed successfully on each image, for printing of each image, wherein, in a case where both the printing process through the printing apparatus and the process of erasure are to be executed on a set of images, for each of the set of images, when it is determined in said determining step that the printing process through the printing apparatus is executed and completed successfully on the image, the process of erasure is executed on the image in said executing step, and when it is determined in said determining step that the printing process through the printing apparatus is executed but not completed successfully on the image, the process of erasure for the image, and the printing process and the process of erasure for all subsequent images among the set of images are inhibited.

* * * * *